(12) United States Patent
Wilkins et al.

(10) Patent No.: US 12,385,402 B2
(45) Date of Patent: Aug. 12, 2025

(54) CMC AIRFOIL WITH COOLING PASSAGE FORMED IN FIBER PLIES

(71) Applicant: RTX CORPORATION, Farmington, CT (US)

(72) Inventors: Peter Wilkins, Glastonbury, CT (US); Jonas Banhos, West Hartford, CT (US); Russell Kim, Temecula, CA (US); James T. Roach, Vernon, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/496,256

(22) Filed: Oct. 27, 2023

(65) Prior Publication Data

US 2025/0137377 A1 May 1, 2025

(51) Int. Cl.
*F01D 5/18* (2006.01)
*F02C 7/18* (2006.01)

(52) U.S. Cl.
CPC .................. *F01D 5/18* (2013.01); *F02C 7/18* (2013.01); *F05D 2260/232* (2013.01); *F05D 2300/6033* (2013.01)

(58) Field of Classification Search
CPC ........ F01D 5/18; F02C 7/18; F05D 2260/232; F05D 2300/6033
See application file for complete search history.

(56) References Cited

U.S. PATENT DOCUMENTS

| 7,217,088 | B2 | 5/2007 | Albrecht et al. | |
| 10,054,055 | B2 | 8/2018 | Spangler et al. | |
| 2013/0312941 | A1 | 11/2013 | Bunker | |
| 2016/0363054 | A1 | 12/2016 | Miranda et al. | |
| 2017/0145832 | A1* | 5/2017 | Mongillo | F02C 7/18 |
| 2017/0145923 | A1 | 5/2017 | Spangler et al. | |
| 2019/0338660 | A1 | 11/2019 | Underwood et al. | |
| 2021/0189886 | A1* | 6/2021 | Dyson | F01D 25/12 |
| 2021/0189902 | A1* | 6/2021 | Dyson | F01D 25/12 |

OTHER PUBLICATIONS

European Search Report for European Patent Application No. 24208441.6 mailed Jan. 9, 2025.

* cited by examiner

*Primary Examiner* — Nathaniel E Wiehe
*Assistant Examiner* — Theodore C Ribadeneyra
(74) *Attorney, Agent, or Firm* — Carlson, Gaskey & Olds, P.C.

(57) ABSTRACT

An airfoil includes a platform and an airfoil section that are formed of a ceramic matrix composite that includes core fiber plies, skin fiber plies, platform fiber plies, and a cooling passage that extends through selected ones of the plies to provide a cooling circuit through the airfoil section and into the platform.

10 Claims, 6 Drawing Sheets

CMC AIRFOIL WITH COOLING PASSAGE FORMED IN FIBER PLIES

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature core gas flow. The high-pressure and temperature core gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil according to an example of the present disclosure includes a platform and an airfoil section that are formed of a ceramic matrix composite that includes core fiber plies, skin fiber plies, platform fiber plies, and a cooling passage that extends through selected ones of the plies to provide a cooling circuit through the airfoil section and into the platform.

In a further example of the foregoing embodiment, the airfoil passage section is bound, relative to the internal cavity, on an inner side and on lateral sides by the at least one intermediate core fiber ply, and is bound on an outer side by one of the skin fiber plies.

In a further example of any of the foregoing embodiments, the at least one inlet orifice extends through at least one of the intermediate core fiber plies.

In a further example of any of the foregoing embodiments, with respect to radial proximity to the gaspath side, the platform fiber plies include first and second platform fiber plies, and at least one intermediate platform fiber ply between the first and second platform fiber plies, and the platform passage section is bound on a first platform passage side by one of the skin fiber plies, is bound on lateral sides by another of the skin fiber plies and by the first platform fiber ply, and is bound on a second platform passage side by one of the intermediate platform fiber plies.

In a further example of any of the foregoing embodiments, in the platform passage section includes a first leg that extends away from the airfoil section, and a second leg that curves around a leading edge of the airfoil section.

In a further example of any of the foregoing embodiments, the airfoil passage section is bound on an inner side and on lateral sides by the at least one intermediate core fiber ply and is bound on an outer side by one of the skin fiber plies, the at least one inlet orifice extends through at least one of the intermediate core fiber plies, with respect to radial proximity to the gaspath side, the platform fiber plies include first and second platform fiber plies, and at least one intermediate platform fiber ply between the first and second platform fiber plies, and the platform passage section is bound on a first platform passage side by one of the at least one intermediate platform fiber plies, is bound on lateral sides by the first platform fiber ply and by the at least one intermediate platform fiber ply, and is bound on a second platform passage side by one of the skin fiber plies.

A further example of any of the foregoing embodiments includes a bypass inlet orifice in the platform, the bypass inlet orifice opening to the platform passage section and connecting the internal cavity with the platform passage section to bypass flow through the airfoil passage section.

In a further example of any of the foregoing embodiments, the at least one cooling passage includes first and second cooling passages extending through, respectively, a suction side wall and a pressure side wall of the airfoil section.

In a further example of any of the foregoing embodiments, the first and second cooling passages are symmetric to each other.

In a further example of any of the foregoing embodiments, the airfoil is in a turbine section of a gas turbine engine.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements. Terms such as "first" and "second," if used, are to differentiate that there are two architecturally distinct components or features. Furthermore, the terms "first" and "second" are interchangeable in that a first component or feature could alternatively be termed as the second component or feature, and vice versa.

DETAILED DESCRIPTION

Figure 1:
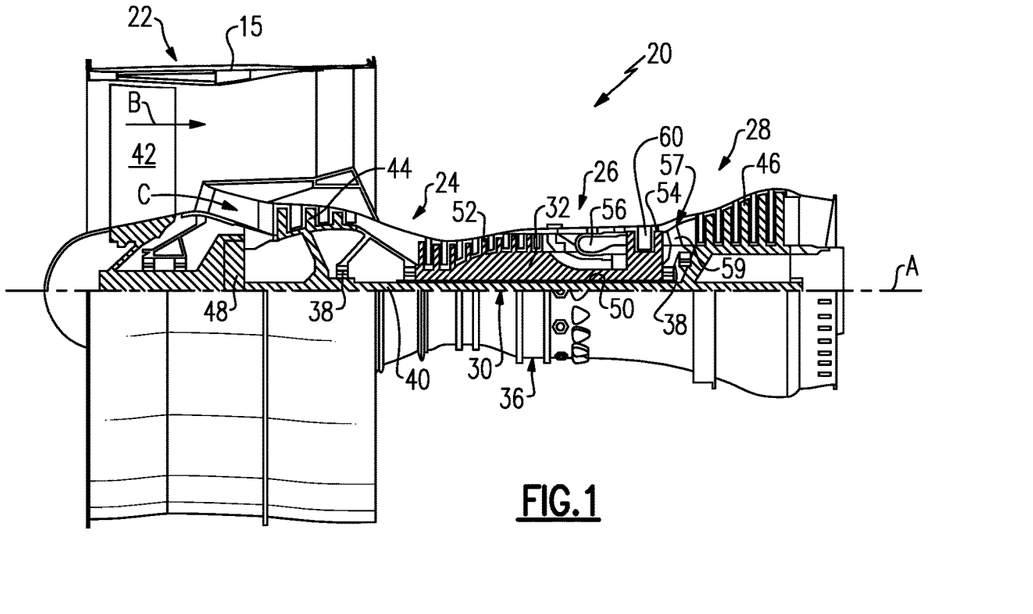
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
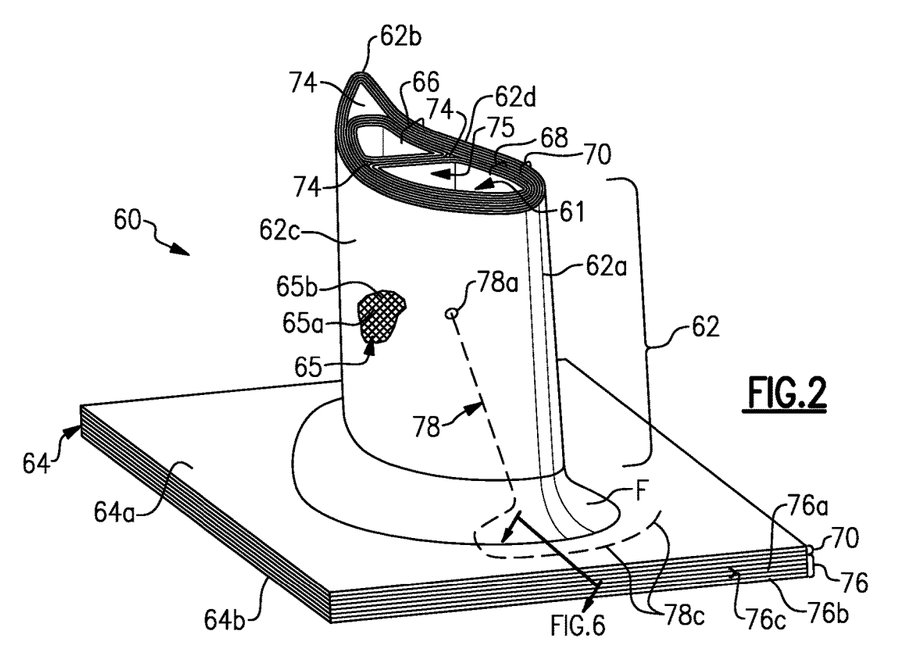
FIG. 2 illustrates an airfoil from the engine.

FIG. 2 illustrates an airfoil 60 from the engine 20. For example, the airfoil 60 is a turbine vane from the turbine section 28 of the engine 20, and there are a plurality of turbine vanes arranged in a circumferential row in the turbine section 28. The airfoil 60 is hollow and includes an airfoil section 62 and a platform 64. The airfoil section 62 defines a leading edge 62a, a trailing edge 62b, a suction side 62c, and a pressure side 62d. The platform 64 includes a core gaspath side 64a and an opposite, non-core-gaspath side 64b. In the examples below, the platform is at a radially inner end of the airfoil section 62, although it is to be understood that the platform 64 may alternatively be at the radially outer end, or the airfoil 60 may include an additional platform 64 at the radially outer end.

The airfoil 60 is formed of a ceramic matrix composite (CMC) 65. Referring to the cutaway section in FIG. 2, the CMC 65 includes ceramic fibers 65a that are disposed in a ceramic matrix 65b. The CMC 65 may be, but is not limited to, a SiC/SiC composite in which SiC fibers are disposed within a SiC matrix. The ceramic fibers 65a are provided in fiber plies 66 that may be woven or braided and may collectively include plies of different fiber weave configurations.

Figure 3A:
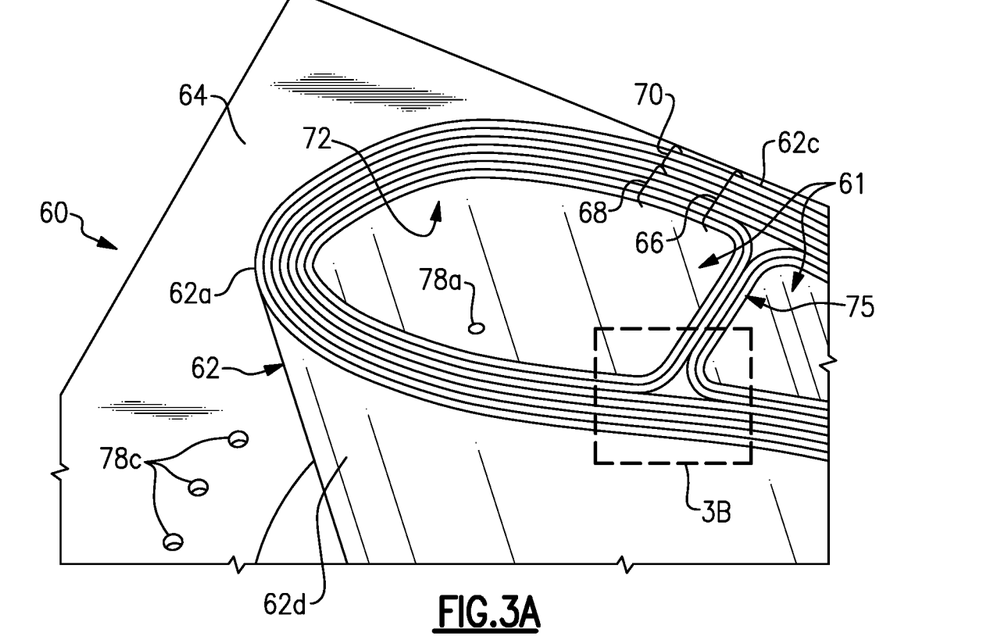
FIG. 3A illustrates fiber plies of the airfoil.
Figure 3B:
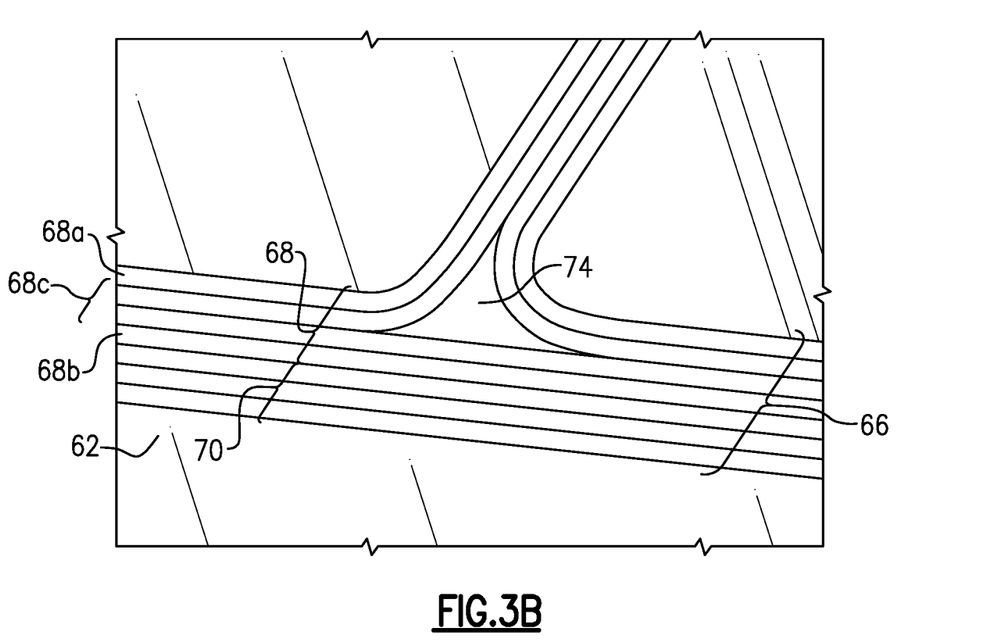
FIG. 3B illustrates an enlarged view of the fiber plies.

Referring to the view in FIG. 3A, and the enlarged view in FIG. 3B (inset from FIG. 2), the fiber plies 66 include core fiber plies 68 and skin fiber plies 70. The core fiber plies 68 define one or more radial tubes 72 that circumscribe one or more internal cavities 61. The skin fiber plies 70 define the exterior profile of the airfoil 60 and wrap around the core fiber plies 68 from the pressure side 62d at the trailing edge 62b, through the leading edge 62a, and to the suction side 62c at the trailing edge 62b. In the illustrated example, there are four core fiber plies 68 and three skin fiber plies 70, although it is to be understood that the numbers of plies 68/70 can be varied.

The core fiber plies 68 include, relative to the internal cavity, an innermost core fiber ply 68a, an outermost core fiber ply 68b, and at least one intermediate core fiber ply 68c (two shown) between the innermost core fiber ply 68a and the outermost core fiber ply 68b. Filler elements 74 are provided in interstitial regions where there is space between plies 66, such as near the trailing edge 62b and at the end of a rib 75 in the airfoil 60 where the plies 66 turn. For example, the filler elements 74 are prefabricated monolithic or CMC pieces. In this example (see FIG. 2), two of the skin plies 70 flare outwardly through a fillet F into the platform 64 and form the surface that is the gaspath surface 64a of the platform 64. The platform includes additional platform fiber plies 76 that extend adjacent the skin fiber plies 70 and make up the radial thickness of the platform 64. With respect to proximity to the gaspath side 64a of the platform ("first" being closest in proximity, followed by "second"), the platform plies 76 include a first platform ply 76a, a second platform ply 76b, and at least one intermediate platform ply 76c (two shown) between the first and second plies 76/76b.

The sides 62c/62d of the airfoil section 62, the fillet F, and the platform 64 may require cooling. In that regard, the airfoil 60 includes at least one cooling passage 78 (shown schematically in FIG. 2) for a flow of cooling air. For example, the cooling air is bleed air from the compressor section 24 that is provided into the internal cavity 61 and flows from the internal cavity 61 into the cooling passage(s) 78.

Figure 4:
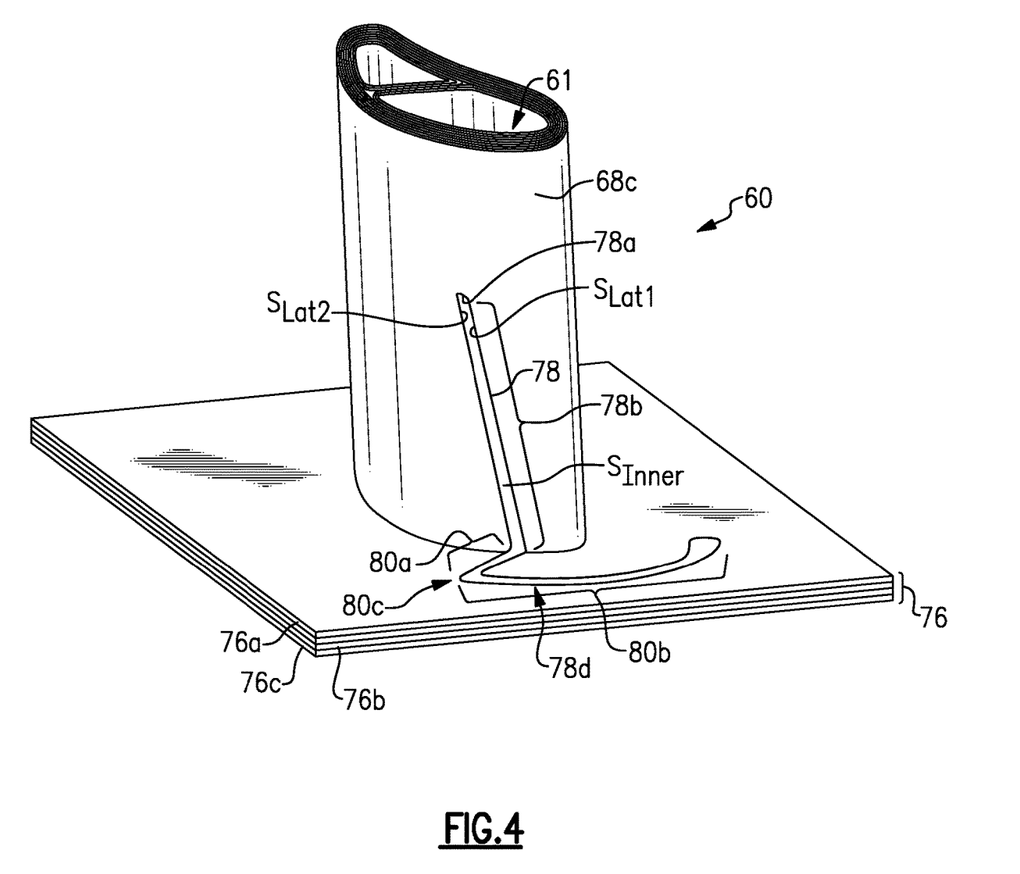
FIG. 4 illustrates the airfoil with several skin plies excluded so that a cooling passage is visible.

FIG. 4 illustrates the airfoil 60 with the skin fiber plies 70 removed so that the passage 78 is visible. In general, in this example, the passage 78 extends radially in the airfoil section 62 from a mid-span region along the suction side wall 62d and then under the fillet F and into the platform 64 near the leading edge 62a. The passage 78 has several sections, including at least one inlet orifice 78a, an airfoil passage section 78b, at least one outlet orifice 78c (FIGS. 2, 3A), and a platform passage section 78d. Examples of each of these sections are discussed in further detail as follows.

The inlet orifice 78a opens through the innermost core fiber ply 68a to the internal cavity 61. In the illustrated example, there is one inlet orifice 78a, and the inlet orifice 78a also extends through at least one of the intermediate core fiber plies 68c (the one contiguous with the innermost core fiber ply 68a). There could alternatively be more than one inlet orifice 78a, such as two, three, or more than five. The inlet orifice 78a in one example has a centerline that is substantially perpendicular to the localized face of the innermost core fiber ply 68a in the internal cavity 61. Such an orientation may be considered to be a "neutral" orientation with regard to incoming cooling air flow. In one alternative example, the inlet orifice 78a is sloped, such as in a radial direction, to facilitate control of flow of the cooling air into the passage 78. A sloped orientation may be considered to be a "non-neutral" orientation that either increases or decreases flow into the passage 78, in comparison to the neutral orientation.

The airfoil passage section 78b initiates at the inlet orifice 78a and extends radially along one or more of the intermediate core fiber plies 68c to the platform 64. In the example shown, the airfoil passage section 78b is of uniform cross-section along its full length and is sloped to have the lower (radially inward) portion forward of the upper (radially outward) portion. The path of the airfoil passage section 78b, however, can be selected to coincide with a particularly hot portion of the airfoil section 62 or leading edge 62a and, in that regard, may be located either farther forward or farther aft than depicted, and the radial length may be lengthened or shortened from that shown.

Where "inner" and "outer" denote relative proximity to the internal cavity 61 ("inner" being closest to the cavity 61, followed by "outer"), the airfoil passage section 78b is bound (see FIG. 4), on an inner side ($S_{Inner}$) by one of the intermediate core fiber plies 68c (the one contiguous with the innermost core fiber ply 68a), is bound on lateral sides ($S_{Lat1}$ and $S_{Lat2}$) by the next consecutive one of the intermediate core fiber plies 68c and the outermost core fiber ply 68b, and is bound on an outer side by one of the skin fiber plies 70 (the one contiguous with the outermost core fiber ply 68b), which is excluded in FIG. 4 but extends across the airfoil passage section 78b shown. The airfoil passage section 78b thus has a height (in the through-wall direction of the airfoil section 62) of two fiber plies and is relatively close (three fiber ply thicknesses) to the exterior surface to provide cooling to the airfoil section 62.

Figure 5:
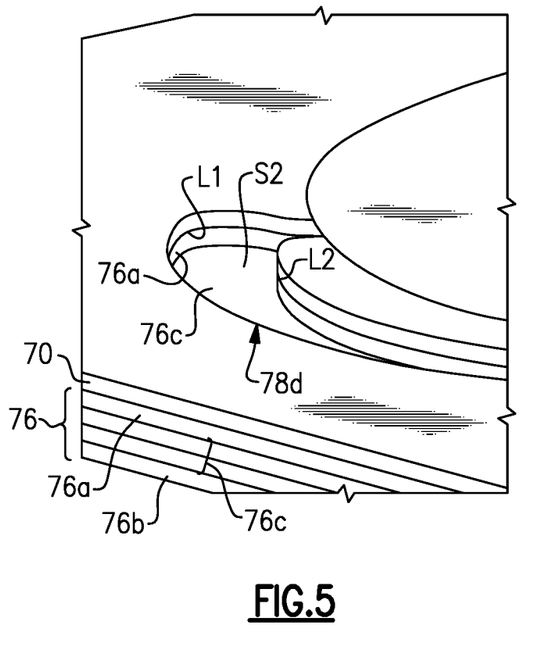
FIG. 5 illustrates a section of a cooling passage in the platform of the airfoil.
Figure 6:
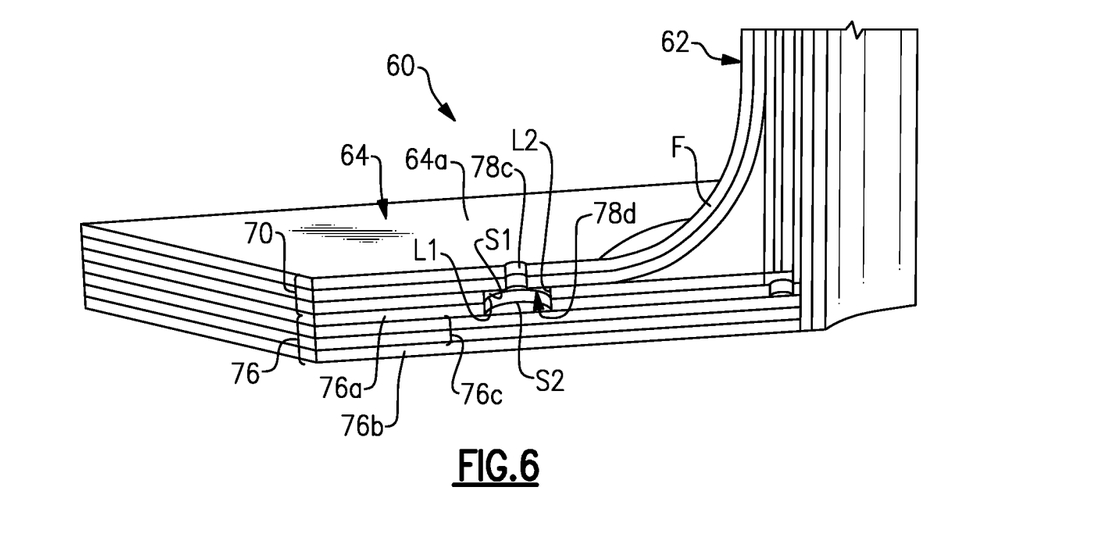
FIG. 6 illustrates a sectioned view through the platform.

The platform passage section 78d, portions of which are also depicted in FIG. 5 (excluding two of the skin fiber plies) and FIG. 6 (sectioned), extends along the platform fiber plies 76 and connects the airfoil passage section 78b to the outlet orifice or orifices 78c. Where "first" and "second" designate proximity to the gaspath side 64a of the platform 64 ("first" being closest in proximity, followed by "second"), the platform passage section 78d is bound on a first platform passage side (S1) by one (the middle one) of the skin fiber plies 70, is bound on lateral sides (L1 and L2) by the first platform fiber ply 76a and another one of the skin fiber plies 70 (the one that is contiguous with the first platform fiber ply 76a), and is bound on a second platform passage side (S2) by one of the intermediate platform fiber plies 76c (the one contiguous with the first platform fiber ply 76a). The platform passage section 78d thus has a height (radially) of two fiber plies and is relatively close (two fiber ply thicknesses) to the gaspath side 64a of the platform to provide cooling to the platform 64.

As best shown in FIG. 4, the platform passage section 78d has first leg 80a and a second leg 80b that meet at an elbow 80c. The first leg 80a extends away from the airfoil section 62, and the second leg 80b curves around the leading edge 62a of the airfoil section 62. The region of the leading edge 62a and fillet F may be under considerable stress. Such stresses in a CMC part may tend to cause delamination between fiber plies. In this regard, the proposition of using a passage close to the leading edge 62a or fillet F is generally undesirable, as it may cause a discontinuity in the ceramic fibers and thereby potentially weaken the CMC material in that area. Rather, the first leg 80a of the platform passage section 78d serves to displace the second leg 80b and outlet orifices 78c a distance from the leading edge 62a and fillet F, so as to circumvent placement of a discontinuity near to those regions.

The outlet orifice or orifices 78c (FIG. 6) open through the skin fiber plies 70. For example, the orifice 78c extends through two of the skin fiber plies 70 (the first two, from the gaspath side 64a). In the overall cooling circuit, the cooling air enters the inlet orifice or orifices 78a, flows down the airfoil passage section 78b, then into the platform passage section 78d, and then out through the outlet orifice or orifices 78c into the core flow path C. The cross-sectional sizes of the orifice 78a, airfoil passage section 78b, platform passage section 78d, and outlet orifice 78c may be selected to provide a desired flow of cooling air and thus a desired level of cooling.

Figure 7:
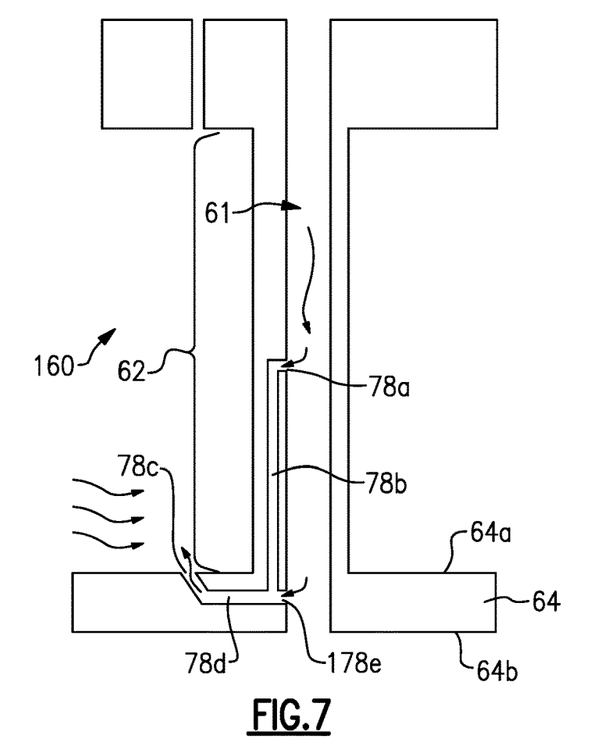
FIG. 7 illustrates an example airfoil that additionally has a bypass inlet orifice.

FIG. 7 illustrates another example of an airfoil 160 that is the same as the airfoil 60, except that the airfoil 160 further includes at least one bypass inlet orifice 178e in the platform 64. The bypass inlet orifice opens to the platform passage section 78d and connects the internal cavity 61 with the platform passage section 78d, to bypass flow through the airfoil passage section 78b. The bypass inlet orifice 178e thus serves to provide additional cooling air flow into the platform passage section 78d.

Figure 8:
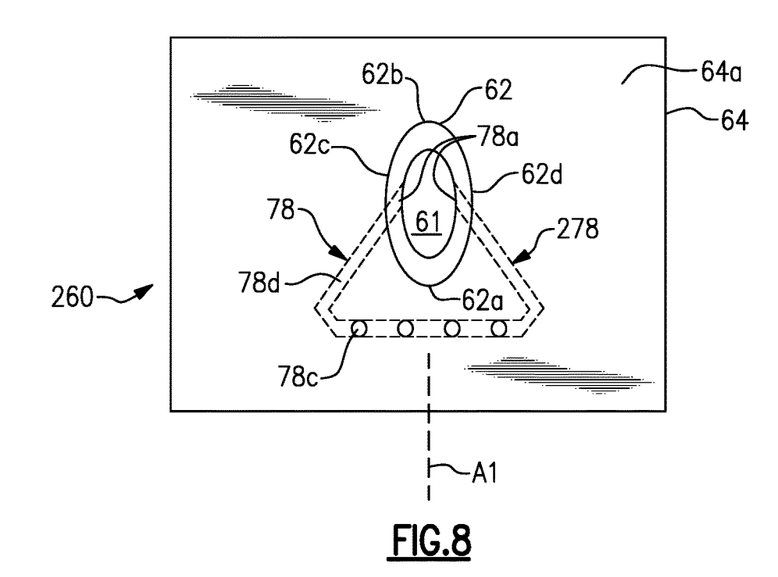
FIG. 8 illustrates an example airfoil that additionally has a second, symmetrical cooling passage.

FIG. 8 illustrates a radial (inward) view of another example of an airfoil 260 that is the same as the airfoil 60, except that the airfoil 260 includes an additional cooling passage 278. The (first) cooling passage 78 extends through the suction side wall 62c and the second cooling passage 278 extend through the pressure side wall 62d. In this case, the outlet orifices 78c and a portion of the platform passage section 78d under the outlet orifices 78c is common to both cooling passages 78/278. As also shown in this example, the cooling passages 78/278 are symmetric to each other about a line of symmetry A1, which may be an axial or chordal line. As an example, such symmetry may facilitate uniform cooling of the airfoil 260, although in other examples the passages 78/278 may be non-symmetric to meet other cooling requirements.

Figure 9:
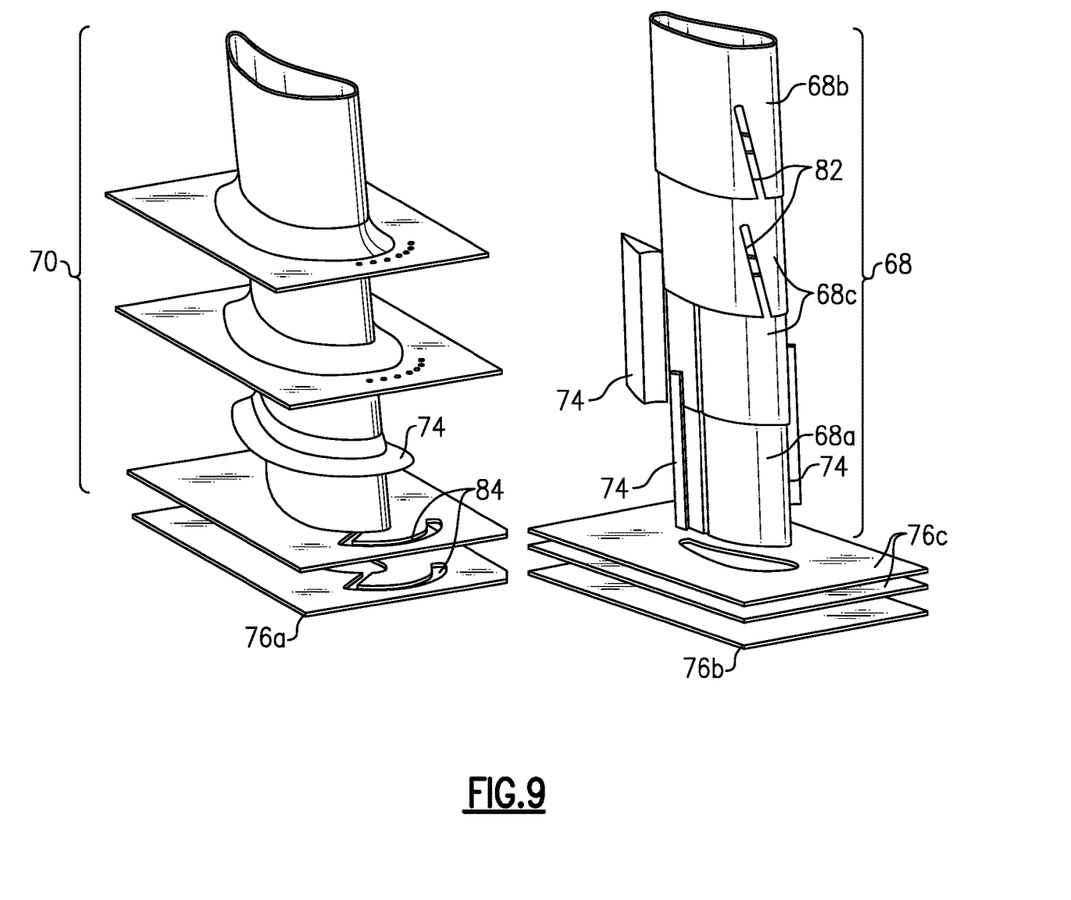
FIG. 9 illustrates an example method for fabricating an airfoil.

FIG. 9 depicts a method for fabricating an airfoil according to the examples herein. Although not limited, the depicted example is based upon a ply lay-up process on which the various fiber plies 66 and filler elements 74 are laid-up to form a preform. For example, the fiber plies 66 initially contain no matrix. The core fiber plies 68 are provided with through-slots 82, which may be formed by laser cutting or other suitable technique that does not substantially damage the fibers or result in undesirably uneven cut lines. The core fiber plies 68 are laid-up on a mandrel or other support surface such that the through-slots 82 align to form the airfoil passage section 78b of the passage 78. The filler elements 74 are positioned adjacent the core fiber plies 68. The skin fiber plies 70 are then wrapped around the core fiber plies 68 and the filler elements 74, and the platform fiber plies 76 are laid-up adjacent to the flared portion of the skin fiber plies 70 to form the platform 64. The platform fiber ply 76a and the flared portion of the inner skin fiber ply 70 includes through-slots 84 that align to form the platform passage section 78d. The preform is then densified with the ceramic matrix to form the CMC 65. For example, the ceramic matrix is formed by, but not limited to, chemical vapor infiltration (CVI), melt infiltration (MI), a hybrid of CVI and MI, and/or polymer infiltration and pyrolysis (PIP). The inlet orifice 78a and outlet orifices 78c may be formed after densification, such as by one or more drilling operations or be cut into the plies prior to layup.

The disclosed methodology enables a substantial portion of the passage 78 to be formed prior to densification. This not only eliminates a need for machining the passages into the final CMC but also enables enhanced densification of the CMC. For instance, densification depends to some extent on the ability of the matrix material or matrix precursor material (i.e., infiltrants) to flow into all depths of the preform during the densification process so that the preform becomes fully densified. In some cases, however, the thickness of the preform can exceed a depth at which the infiltrants can readily flow under practical processing conditions and times and achieve the desired density. As a result, the preform may be only partially densified in some regions, with pores or voids in the regions that the infiltrant cannot reach. The through-slots 82/84 provide additional flow paths for the matrix material or matrix precursor material during densification and thereby can enhance densification in regions that may otherwise not be fully densified.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
   a platform having a core gaspath side and an opposite, non-core-gaspath side; and
   an airfoil section extending from the core gaspath side of the platform, the airfoil section and the platform being formed of a ceramic matrix composite including:
      core fiber plies defining a radial tube that circumscribes an internal cavity in the airfoil section, the core fiber plies including, relative to the internal cavity, an innermost core fiber ply, an outermost core fiber ply, and at least one intermediate core fiber ply between the innermost core fiber ply and the outermost core fiber ply,
      skin fiber plies defining an exterior of the airfoil section, the skin fiber plies wrapping around the core fiber plies and flaring outwardly through a fillet into the platform,
      platform fiber plies extending in the platform adjacent the skin fiber plies; and
   at least one cooling passage including:
      at least one inlet orifice opening through the innermost core fiber ply to the internal cavity,
      an airfoil passage section extending along the at least one intermediate core fiber ply from the at least one inlet orifice to the platform, the airfoil passage section bound, relative to the internal cavity, on an inner side and on lateral sides by the at least one intermediate core fiber ply, and is bound on an outer side by one of the skin fiber plies
      at least one outlet orifice in the platform opening through the skin fiber plies to the core gaspath side, and
      a platform passage section extending along the platform fiber plies and connecting the airfoil passage section to the at least one outlet orifice.

2. The gas turbine engine as recited in claim 1, wherein the at least one inlet orifice extends through at least one of the intermediate core fiber plies.

3. The gas turbine engine as recited in claim 1, wherein, with respect to radial proximity to the gaspath side, the platform fiber plies include first and second platform fiber plies, and at least one intermediate platform fiber ply between the first and second platform fiber plies, and the platform passage section is bound on a first platform passage side by one of the skin fiber plies, is bound on lateral sides by another of the skin fiber plies and by the first platform fiber ply, and is bound on a second platform passage side by one of the intermediate platform fiber plies.

4. The gas turbine engine as recited in claim 3, wherein in the platform passage section includes a first leg that extends away from the airfoil section, and a second leg that curves around a leading edge of the airfoil section.

5. The gas turbine engine as recited in claim 1, wherein the airfoil passage section is bound on an inner side and on lateral sides by the at least one intermediate core fiber ply and is bound on an outer side by one of the skin fiber plies, the at least one inlet orifice extends through at least one of the intermediate core fiber plies, with respect to radial proximity to the gaspath side, the platform fiber plies include first and second platform fiber plies, and at least one intermediate platform fiber ply between the first and second platform fiber plies, and the platform passage section is bound on a first platform passage side by one of the at least one intermediate platform fiber plies, is bound on lateral sides by the first platform fiber ply and by the at least one intermediate platform fiber ply, and is bound on a second platform passage side by one of the skin fiber plies.

6. The gas turbine engine as recited in claim 1, further comprising a bypass inlet orifice in the platform, the bypass inlet orifice opening to the platform passage section and connecting the internal cavity with the platform passage section to bypass flow through the airfoil passage section.

7. The gas turbine engine as recited in claim 1, where the at least one cooling passage includes first and second cooling passages extending through, respectively, a suction side wall and a pressure side wall of the airfoil section.

8. The gas turbine engine as recited in claim 7, where the first and second cooling passages are symmetric to each other.

9. A gas turbine engine comprising:
a compressor section;
a combustor in fluid communication with the compressor section; and
a turbine section in fluid communication with the combustor, the turbine section having an airfoil comprising:
  a platform having a core gaspath side and an opposite, non-core-gaspath side;
  an airfoil section extending from the core gaspath side of the platform, the airfoil section and the platform being formed of a ceramic matrix composite including:
    core fiber plies defining a radial tube that circumscribes an internal cavity in the airfoil section, the core fiber plies including, relative to the internal cavity, an innermost core fiber ply, an outermost core fiber ply, and at least one intermediate core fiber ply between the innermost core fiber ply and the outermost core fiber ply,
    skin fiber plies defining an exterior of the airfoil section, the skin fiber plies wrapping around the core fiber plies and flaring outwardly through a fillet into the platform,
    platform fiber plies extending in the platform adjacent the skin fiber plies; and
  at least one cooling passage including:
    at least one inlet orifice opening through the innermost core fiber ply to the internal cavity,
    an airfoil passage section extending along the at least one intermediate core fiber ply from the at least one inlet orifice to the platform,
    at least one outlet orifice in the platform opening through the skin fiber plies to the core gaspath side, and
    a platform passage section extending along the platform fiber plies and connecting the airfoil passage section to the at least one outlet orifice, wherein, with respect to radial proximity to the gaspath side, the platform fiber plies include first and second platform fiber plies, and at least one intermediate platform fiber ply between the first and second platform fiber plies, and the platform passage section is bound on a first platform passage side by one of the skin fiber plies, is bound on lateral sides by another of the skin fiber plies and by the first platform fiber ply, and is bound on a second platform passage side by one of the intermediate platform fiber plies.

10. An airfoil comprising:
a platform having a core gaspath side and an opposite, non-core-gaspath side; and
an airfoil section extending from the core gaspath side of the platform, the airfoil section and the platform being formed of a ceramic matrix composite including:
  core fiber plies defining a radial tube that circumscribes an internal cavity in the airfoil section, the core fiber plies including, relative to the internal cavity, an innermost core fiber ply, an outermost core fiber ply, and at least one intermediate core fiber ply between the innermost core fiber ply and the outermost core fiber ply,
  skin fiber plies defining an exterior of the airfoil section, the skin fiber plies wrapping around the core fiber plies and flaring outwardly through a fillet into the platform,
  platform fiber plies extending in the platform adjacent the skin fiber plies; and
at least one cooling passage including:
  at least one inlet orifice opening through the innermost core fiber ply to the internal cavity,
  an airfoil passage section extending along the at least one intermediate core fiber ply from the at least one inlet orifice to the platform,
  at least one outlet orifice in the platform opening through the skin fiber plies to the core gaspath side, and
  a platform passage section extending along the platform fiber plies and connecting the airfoil passage section to the at least one outlet orifice, wherein the at least one cooling passage includes first and second cooling passages extending through, respectively, a suction side wall and a pressure side wall of the airfoil section, and the first and second cooling passages are symmetric to each other.

* * * * *